(12) United States Patent
Spijkman et al.

(10) Patent No.: US 9,394,182 B2
(45) Date of Patent: Jul. 19, 2016

(54) FREE FLOWING SALT COMPOSITION PREPARED BY EVAPORATIVE CRYSTALLIZATION

(71) Applicant: AKZO NOBEL CHEMICALS INTERNATIONAL B.V., Amersfoort (NL)

(72) Inventors: Frits Spijkman, Deventer (NL); Roberot Aloysius Gerardus Maria Bergevoet, Beek (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/412,936

(22) PCT Filed: Jul. 10, 2013

(86) PCT No.: PCT/EP2013/064577
§ 371 (c)(1),
(2) Date: Jan. 5, 2015

(87) PCT Pub. No.: WO2014/009411
PCT Pub. Date: Jan. 16, 2014

(65) Prior Publication Data
US 2015/0191361 A1  Jul. 9, 2015

Related U.S. Application Data

(60) Provisional application No. 61/680,811, filed on Aug. 8, 2012.

(30) Foreign Application Priority Data

Jul. 12, 2012 (EP) .................................... 12176201

(51) Int. Cl.
*B01D 9/02* (2006.01)
*C01D 3/06* (2006.01)
*C01D 3/24* (2006.01)
*C01D 3/04* (2006.01)

(52) U.S. Cl.
CPC .. *C01D 3/06* (2013.01); *C01D 3/04* (2013.01); *C01D 3/24* (2013.01)

(58) Field of Classification Search
CPC ............... B01D 9/00; B01D 9/02; C13K 1/10

USPC ........................................................ 23/295 R
See application file for complete search history.

(56) References Cited

U.S. PATENT DOCUMENTS

2003/0009857 A1 * 1/2003 Mayer ..................... C01D 3/16
23/300

FOREIGN PATENT DOCUMENTS

| CN | 101559340 | 10/2009 |
|----|-----------|---------|
| CN | 101585549 | 11/2009 |
| DE | 1 265 151 | 4/1968 |
| DE | 62316 | 6/1968 |
| EP | 1 022 252 | 7/2000 |
| EP | 1 404 615 | 1/2005 |
| GB | 822893 | 11/1959 |
| JP | 1-145319 | 6/1989 |
| JP | 1-145320 | 6/1989 |
| JP | 05064735 | 3/1993 |
| JP | 2010-110720 | 5/2010 |
| WO | 02/49983 | 6/2002 |
| WO | 03/006377 | 1/2003 |
| WO | 2004/018068 | 3/2004 |
| WO | 2005/121411 | 12/2005 |
| WO | 2006/045718 | 5/2006 |
| WO | 2006/087302 | 8/2006 |
| WO | 2006/087303 | 8/2006 |
| WO | 2011/128242 | 10/2011 |
| WO | 2011/147922 | 12/2011 |

OTHER PUBLICATIONS

European Search Report for Application No. 12176201.7 dated Feb. 4, 2013.
PCT Search Report and Written Opinion for Application No. PCT/EP2013/064577 mailed Oct. 7, 2013.

* cited by examiner

*Primary Examiner* — Edward Johnson
(74) *Attorney, Agent, or Firm* — Kenyon & Kenyon LLP

(57) ABSTRACT

Evaporative crystallization process to make salt compositions which comprises a step wherein a mother liquor is formed containing water and the salt to be crystallized and 1-5 ppm of an additive, based on the weight of the mother liquor, said additive being a water-soluble acrylic polymer, and a further step of evaporating the water to form crystallized salt.

12 Claims, 11 Drawing Sheets

FREE FLOWING SALT COMPOSITION PREPARED BY EVAPORATIVE CRYSTALLIZATION

REFERENCE TO RELATED APPLICATIONS

This application is the U.S. National Phase of PCT/EP2013/064577, filed on Jul. 10, 2013, and claims the benefit of EP Application No. 12176201.7, filed on Jul. 12, 2012, and U.S. Provisional Application No. 61/680,811, filed on Aug. 8, 2012.

The present invention relates to a process to make salt (sodium chloride) of high flowability.

It has been found that a relationship exists between the structure of the crystal lattice and the flowability of the salt crystals. The object of the present invention is to provide salt crystals having good flowability.

The prior art does not fail in attempts to provide flowable salt crystals.

GB-A-822 893 discloses a method for making non-caking common salt crystals. The method consists of adding to purified or unpurified brine from 1 to 500 ppm, in particular 5 ppm by weight, of brine, of resinuous copolymers containing carboxyl groups dissociating to yield polyanions, and evaporating the brine. This copolymer can be a copolymer of vinyl acetate with maleic anhydride or with a salt of maleic acid. The obtained crystals are described as hollow-faced crystals or hexagonal crystals and it is mentioned that even spherical crystals may be obtained. GB-A-822 893 teaches that salt crystals that are not prone to cake must be irregular.

JP-A-1 145 319 discloses adding 5 to 1000 ppm sodium hexametaphosphate to a saturated or approximately saturated solution containing purified salt or ordinary salt to form highly flowable octahedral to tetradecahedral crystals. In the examples 10 ppm and 100 ppm of sodium hexametaphosphate are added to a salt solution and octahedral crystals are obtained.

JP-A-1 145 320 discloses adding 50 to 1000 ppm of polyacrylate to a saturated or approximately saturated solution containing purified salt or ordinary salt to form highly flowable octrahedral to tetradecahedral crystals. In the examples 80 ppm and 150 ppm of sodium polyacrylate are added to a salt solution and octahedral crystals are obtained.

EP-A-1 022 252 discloses making salt crystals having improved free flowability by adding sodium polymetaphosphate $(NaPO_3)_x$ to a clear, hot raw salt solution reaching crystallization to achieve an evenly grained crystallizate in order to reduce caking tendency. $(NaPO_3)_x$ is added in an amount sufficient to obtain a content of <1 ppm sodium polymetaphosphate based on the amount of dry salt.

The object of the present invention is to provide a further process for producing salt, using low amounts of an additive while resulting in salt crystals displaying good flowability characteristics.

The present invention therefore relates to an evaporative crystallization process to make salt compositions which includes a step wherein a mother liquor is formed containing (i) water and (ii) the salt to be crystallized, and (iii) 1-5 ppm (mg/kg) of an additive, based on the weight of the mother liquor, said additive being a water-soluble acrylic polymer, and a further step of evaporating the water to form the crystallized salt. More preferred ranges for the additive are: 1.5-5 ppm, 2-5 ppm, 2.5-5, 3-5 ppm, 3.5-5 ppm, 4-5 ppm, 4.5-5 ppm, 1.5-4.5 ppm, 2-4.5 ppm, 2.5-4.5 ppm, 3-4.5 ppm, 3.5-4.5 ppm, 4-4.5 ppm, 1.5-4 ppm, 2-4 ppm, 2.5-4, 3-4 ppm, 3.5-4 ppm, 1.5-3 ppm, 2-3 ppm, and 2.5-3 ppm. The resulting crystallized salt shows a good flowability, meaning an angle of approach of less than 38°, preferably of less than 35°. This flowability is better than that obtained with cubically shaped (6-square-faced) or octahedrally shaped (eight faced) crystals.

In addition, the chemical purity of the crystals is still sufficient to allow their use in membrane electrolysis cells.

Without wishing to be bound by theory, this improved flowability might be caused by the very formation of at least 50% tetradecahedrally shaped crystals. A tetradecahedrally shaped crystal is a 14-faced crystal. It can be described as having a near spherical shape (also referred to as globular shape) or a shape approximating a sphere. Since spherically shaped particles or globularly shaped particles have improved flowability compared to cubically or octahedrally shaped ones, a crystallized salt according to the invention has improved flow characteristics.

The additives are water-soluble acrylic polymers. The water-soluble acrylic polymer according to the invention is a polymer derived from repeated subunits of (i) monomers of acrylic acid or its derivatives or (ii) two (or more) monomeric species, wherein one monomer is acrylic acid or one of its derivatives (copolymer). Acrylic polymer according to the invention further means both the acid and the salt form. The acrylic polymer is preferably a copolymer of acrylic acid and maleic acid, and/or their salts. A water-soluble acrylic polymer to be used according to the invention is defined as water-soluble when it forms a solution in water (aqua dest.) containing at least 10 grams of acrylic polymer per liter of water (aqua dest.) at a temperature of 25° C. and a pressure of 1 bar. The acrylic polymer may further contain phosphate, phosphonate, phosphino, sulfate, and/or sulfonate groups. Examples are phosphino carboxylic acid acrylic polymers, and 2-acrylamido-2-methylpropane sulfonic acid (AMPS) acrylic polymers. The acrylic polymer preferably has a weight average molecular weight (Mw) of approximately 1000 to and including approximately 15000.

In a typical crystallization plant mother liquor of (near) saturated brine is fed to so-called crystallizers. In a crystallizer the salt crystals are formed due to the removal of water by evaporation of water. A crystallization plant may consist of one crystallizer or of more than one crystallizers in series (multi-effect plant). In a multi-effect plant the remaining mother liquor of one crystallizer is fed to the next together with—if needed—fresh (near) saturated brine. The salt slurry may be removed from the crystallizers in the line by means of cyclones and/or elutriation.

After crystallization of the salt, the salt may be washed and/or dried. The salt may be dried completely or only partially. If the salt is only partially dried, a wet salt is produced.

The term wet salt is used to denominate "predominantly sodium chloride" containing a substantial amount of water. More particularly, it is a water-containing salt of which more than 50% by weight consists of NaCl. Preferably, such salt contains more than 90% by weight of NaCl. More preferably, the salt contains more than 92% of NaCl, while a salt being essentially NaCl and water is most preferred. The wet salt will contain more than 0.5%, preferably more than 1.0%, more preferably more than 1.5% by weight of water. Preferably it contains less than 10% by weight, more preferably less than 6% by weight and most preferably less than 4% by weight of water. Typically the salt will contain 2-3% of water. All of the weight percentages given are based on the weight of the total composition.

The (wet) salt resulting from the process of the present invention may suitably be used in electrolysis using, for instance, a membrane electrolysis cell. Further advantages are minimal contamination of the salt with organic compounds. The resulting salt is well suited for use in chlorine production.

EXAMPLES

Preparation Example

Comparative 1500 grams of brine from a natural source were heated until boiling in a vacuum evaporator at a pressure of 160 mbars. Evaporation was stopped when about 700 ml of water were received in a receiver glass bottle. The salt slurry was filtered and subsequently washed on a filter with high purity brine. Subsequently, the salt was centrifuged and dried in a fluid bed dryer. The obtained crystals were examined under a light microscope. The crystals obtained were cubically shaped. A random sample of the obtained crystals is shown in FIG. 1.

Example 1

Comparative

A stock solution was made of 1.2 grams of Acumer 4300 (a 50% aqueous solution of an acrylic maleic copolymer with Mw=2000) and 47.5 grams of water. 4.8 grams of this solution were added to 3,000 grams of brine, resulting in 20 ppm of copolymer in the brine. 1,500 grams of this brine were heated in an evaporator as in the Preparation Example (Comparative) until 700 ml of condensate had been received. The obtained crystals were examined under a light microscope and it was observed that around 80% of the crystals were octahedrons. The remaining crystals were tetradecahedrally (14 faced) shaped. A random sample of the obtained crystals is shown in FIG. 2.

Example 2

Comparative

Example 1 was repeated, except that 1.9 grams of the aqueous Acumer 4300 solution were added to 3,015 grams of brine resulting in 8 ppm polymer in the brine. More than 70% of the obtained crystals were octahedrally shaped. A random sample of the obtained crystals is shown in FIG. 3.

Example 3

According to the Invention

Example 1 was repeated, except that 0.971 gram of the aqueous Acumer 4300 solution was added to 2,999 grams of brine resulting in 4 ppm polymer in the brine. More than 50% of the obtained crystals were tetradecahedrally shaped. A random sample of the obtained crystals is shown in FIG. 4.

Example 4

According to the Invention

Example 1 was repeated, except that 0.483 gram of the aqueous Acumer 4300 solution was added to 3,004 grams of brine resulting in 2 ppm polymer in the brine. More than 50% of the obtained crystals were tetradecahedrally shaped. A random sample of the obtained crystals is shown in FIG. 5.

Example 5

According to the Invention

A stock solution was made of 0.53 grams of Acumer 1051 (a 43% aqueous solution of a neutralised acrylic polymer with Mw=2000-2300) and 99.56 grams of water. 0.66 grams of this solution were added to 1723 grams of brine, resulting in 1 ppm of acrylic polymer in the brine. This brine was heated until boiling in a vacuum evaporator at a pressure of 160 mbars. Evaporation was stopped when about 1011 grams of water were received in a receiver glass bottle. The salt slurry was filtered and subsequently washed on a filter with high purity brine. Subsequently, the salt was centrifuged. The obtained crystals were examined under a light microscope. More than 50% of the obtained crystals were tetradecahedrally shaped.

Example 6

According to the Invention

A stock solution was made of 1.00 grams of Acumer 1050 (a 50% aqueous solution of an acrylic polymer with Mw=2000-2300) and 99.01 grams of water. 1.86 grams of this solution were added to 1859 grams of brine, resulting in 5 ppm of acrylic polymer in the brine. This brine was heated until boiling in a vacuum evaporator at a pressure of 160 mbars. Evaporation was stopped when about 839 grams of water were received in a receiver glass bottle. The salt slurry was filtered and subsequently washed on a filter with high purity brine. Subsequently, the salt was centrifuged and dried in a fluid bed dryer. The obtained crystals were examined under a light microscope. More than 50% of the obtained crystals were tetradecahedrally shaped. The remaining crystals were octahedrally shaped. A random sample of the obtained crystals is shown in FIG. 6.

Testing Example

This Example first of all shows the effect of the addition of 2.6 ppm acrylic polymer on the flowability of the thus produced salt (according to the invention), compared to untreated salt (cubically shaped crystals). The untreated salt (cubically shaped crystals) was prepared in accordance with the Preparation Example (Comparative), and is in the following also referred to as the reference salt.

The commercially available acrylic polymer Acumer 1050 (Mw=2000-2300, 50 wt % aqueous solution) was added to a saturated feed brine in an amount of 2.05 liters per 400 m$^3$. The effective concentration was therefore 2.6 ppm of polymer. More than 50% of the obtained crystals were tetradecahedrally shaped. The plant test lasted for 28 hours during which around 2500 tons of salt were made. The salt was washed with brine and water and partially dried in a centrifuge.

The flow properties of this salt were measured as follows and compared with the reference salt.

The first reference salt sample (Sample 1 (reference salt)) was taken before the additive was added to the saturated feed brine. Thereafter, two samples were taken from salt produced with addition of the additive to the saturated feed brine (Samples 2 and 3 (2.6 ppm)). A second reference sample was taken of salt produced thereafter, which was again produced without any addition of the additive to the saturated feed brine, thereby again producing the reference salt (Sample 4 (reference salt)). Random samples of the obtained crystals are shown in FIGS. 7 to 10.

The results are shown in Table 1.

The flowability was tested by measuring the critical angle of approach and the gap width using laboratory equipment. The critical angle of approach is the angle $\alpha_{1,2}$ as shown in FIG. 11. The critical angle of approach is an important parameter for bulk powders because it is a measure for the ease of flow of a powder during handling and storage. The critical angle of approach dropped from 38° for the dried, cubically shaped, reference salt to 34.5° for the dried salt composition according to the present invention containing 2.6 ppm of acrylic polymer. This is quite a significant improvement in flowability. The gap width indicates at which gap size the powder begins to flow. It is a measure for the ability of powders to form bridges during bulk storage as a consequence of bad flowability, the smaller the gap, the higher the flowability. The gap width dropped from 3 to 2 mm. This is a significant improvement.

Another test was done to measure the internal friction of the salt. Using a Jenike shear cell, the angle of internal friction was measured. In a Jenike shear cell a force is applied vertically to an amount of powder. Then a force is applied to the side of the sample. The force is increased using an electromotor until the powder starts to glide. The force that is needed to push the powder sideways is recorded and depends on the vertically applied force. By measuring the required force for several vertical forces and making a plot of the results, a near-straight line is obtained with a slope that is a measure for the powder's internal friction. The lower the angle of friction, the easier the bulk powder flows under the stress of its own weight. The average angle of friction of the wet reference salt was 49°, while for the wet salt composition according to the present invention had an average angle of friction of 42.5°. This clearly demonstrates the better flowability of the wet salt composition according to the present invention.

Piles of 25 tons of wet salt were stored in a dry warehouse after treatment with an anticaking material. Periodically, tests were performed to measure the flowability of the stored salt. This storage stability was determined by a penetration test with a manually operated ground drill equipped with a torsion meter. The drill was manually driven into the salt pile by rotation. At a specific depth, the resistance towards rotation became higher than the preset value of the torsion meter and the torsion meter started to slip. The depth of penetration at that point was recorded and is a measure for the resistance of a bulk powder towards penetration by, for instance, a dozer or a loader. The value for the penetration after 9 days of storage with a preset value for the torsion meter of 12.5 Nm increased from 9.9 cm for the reference salt to 33 cm for the salt composition according to the present invention. This is a significant improvement.

The results of the different flowability tests are summarized in Table 2. The values in Table 2 are the number average of Samples 1 and 4 and Samples 2 and 3, respectively. All tests clearly demonstrate that the ability to flow of a salt composition according to the present invention is superior compared to untreated salt. The other examples according to the invention yield similar results.

TABLE 1

|  | Sample 1 Reference salt | Sample 2 (2.6 ppm) | Sample 3 (2.6 ppm) | Sample 4 Reference salt |
| --- | --- | --- | --- | --- |
| Angle of approach (after drying) | 38° | 34.5° | 34.5° | 38° |
| gap width | 3 mm | 2 mm | 2 mm | 3 mm |

TABLE 2

|  | Reference salt (number average of Samples 1 and 4) Cubically shaped crystals | Salt treated with 2.6 ppm acrylic polymer (number average of Samples 2 and 3) Tetradecahedrally shaped crystals |
| --- | --- | --- |
| Angle of approach (after drying) | 38° | 34.5° |
| Internal friction according to Jenike test (wet salt) | 49° | 42.5° |
| Penetration with a ground drill (torsion 12.5 Nm) after 9 days storage of a 25 ton wet salt pile | 9.9 cm | 33 cm |

DESCRIPTION OF THE FIGURES

All Figures show exemplary, randomly selected crystals of samples for the purpose of further illustrating the invention. The average sample size taken varied but was approx. in the range of 5-250 mg. The Figures show various numbers of crystals, obtained from the respective example.

FIG. 1 shows a random section of a sample of the comparative Preparation Example (reference salt), analysed under a light microscope. Approximately 30 crystals can be seen in the picture. The crystals examined by way of light-microscopy are all cubically shaped. All crystals in FIG. 1 are agglutinated to other crystals on at least one side and have thereby formed larger agglomerates.

FIG. 2 shows a random section of a sample of comparative Example 1 (20 ppm), analysed under a light microscope. Around 80% of the fully grown crystals in the sample were octahedrally shaped. More than 20 crystals are shown in FIG. 2. First signs of agglomeration can be found in FIG. 2 as several crystals are agglutinated to another crystal on at least one side.

FIG. 3 shows a random section of a sample of comparative Example 2 (8 ppm), analysed under a light microscope. FIG. 3 shows 2 fully grown, octahedrally shaped crystals. FIG. 3 shows that the octahedral crystals are not spherically shaped and that the crystals with octahedral shape are rather bulky.

FIG. 4 shows a random section of a sample of Example 3 (4 ppm), analysed under a light microscope. The crystals were tetradecahedrally shaped (crystals with 14 faces). All seven crystals depicted in FIG. 4 have a globular shape. There are no signs of agglutination.

FIG. 5 shows a random section of a sample of Example 4 (2 ppm), analysed under a light microscope. 15 fully grown crystals can be seen in FIG. 5. More than 50% of these fully grown crystals are tetradecahedrally shaped. The remaining crystals are cubically shaped.

FIG. 6 shows a random section of a sample of Example 6 (5 ppm), analysed under a light microscope. A larger number of crystals is shown in FIG. 6. More than 50% of the crystals are tetradecahedrally shaped, in other words having a globular shape. The remaining crystals in FIG. 6 are octahedrally shaped.

FIG. 7 shows a random section of Sample 1 (reference salt) of the Testing Example, analysed under a light microscope. A larger number of crystals can be seen in FIG. 7. All crystals shown in FIG. 7 are cubically shaped. Almost all crystals in FIG. 7 are agglutinated on at least one side and have thereby formed larger agglomerates.

FIG. 8 shows a random section of Sample 2 (2.6 ppm) of the Testing Example, according to the invention, analyzed under a light microscope. Approximately 60 crystals are shown in FIG. 8. More than 70% of the fully grown crystals in FIG. 8 are tetradecahedrally shaped. No agglomerates can be found in the figure.

FIG. 9 shows a random section of Sample 3 (2.6 ppm) of the Testing Example, according to the invention, analyzed under a light microscope. Approximately 70 crystals are shown in FIG. 9. All fully grown crystals in FIG. 9 are tetradecahedrally shaped. No agglomerates can be found in the figure.

FIG. 10 shows a random section of Sample 4 (reference salt) of the Testing Example, analysed under a light microscope. All crystals shown in FIG. 10 are cubically shaped. The majority of crystals in FIG. 10 are agglutinated on at least one side and have thereby formed larger agglomerates.

FIG. 11 shows a schematic drawing of the apparatus and the principle of measuring the critical angle of approach. The measuring apparatus (10) is shown in a status (I) before measurement of the angle. The upper part of the measuring apparatus (10), the filling area (11), is filled with a salt (12). The measuring apparatus (10) contains plates (14-1) and (14-2) which are horizontally, in x-direction movably, mounted in the apparatus (10) and separate the filling area (11) from the bottom part (13) of the measuring apparatus (10). The filling level of the salt (12) is indicated by filling level indicator (16).

Figure 1:
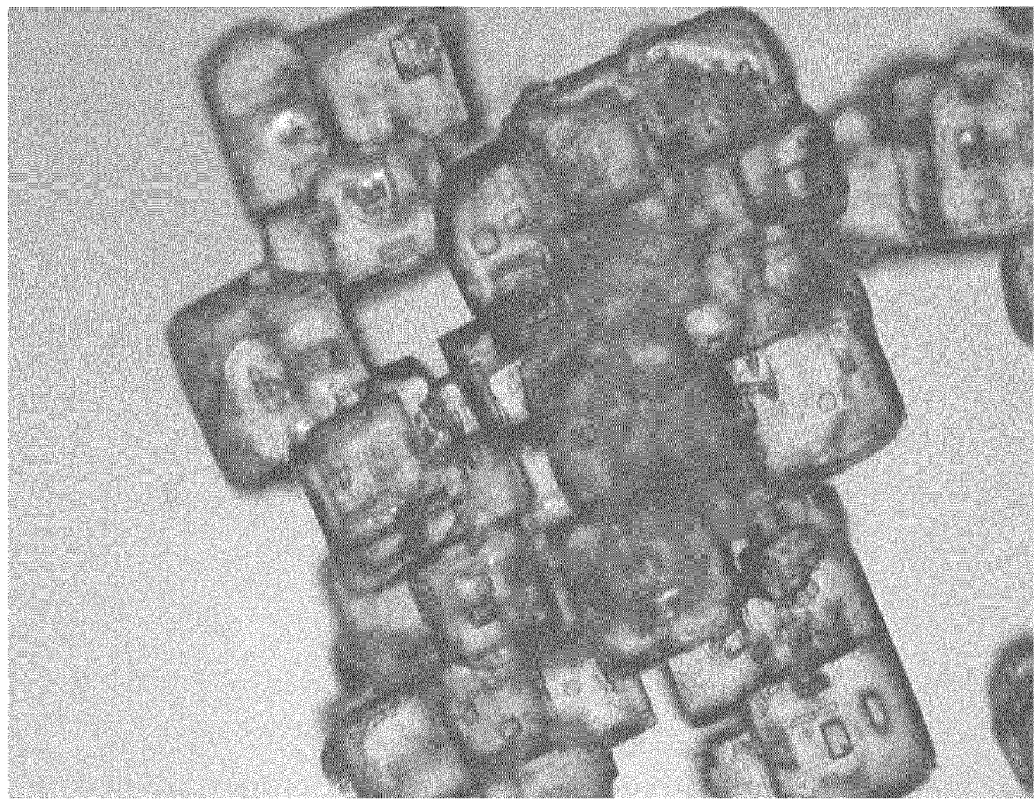
FIG. 1 (Preparation Example (Comparative))
Figure 2:
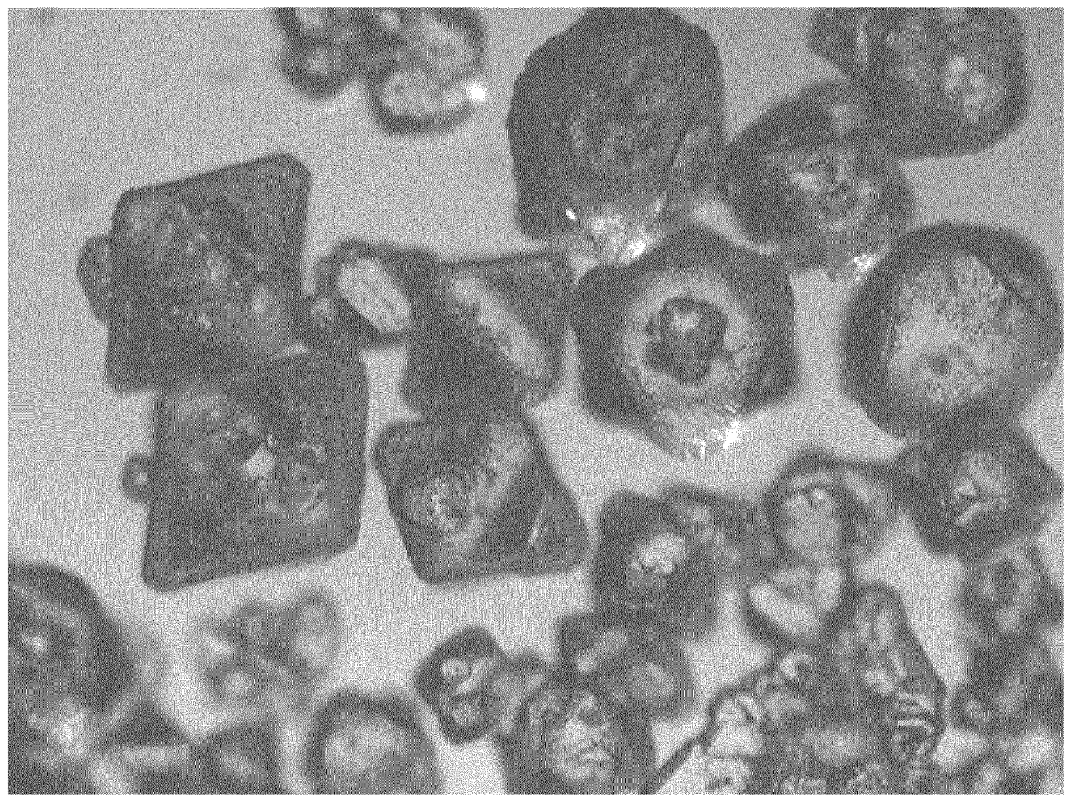
FIG. 2 (Example 1 [Comparative])
Figure 3:
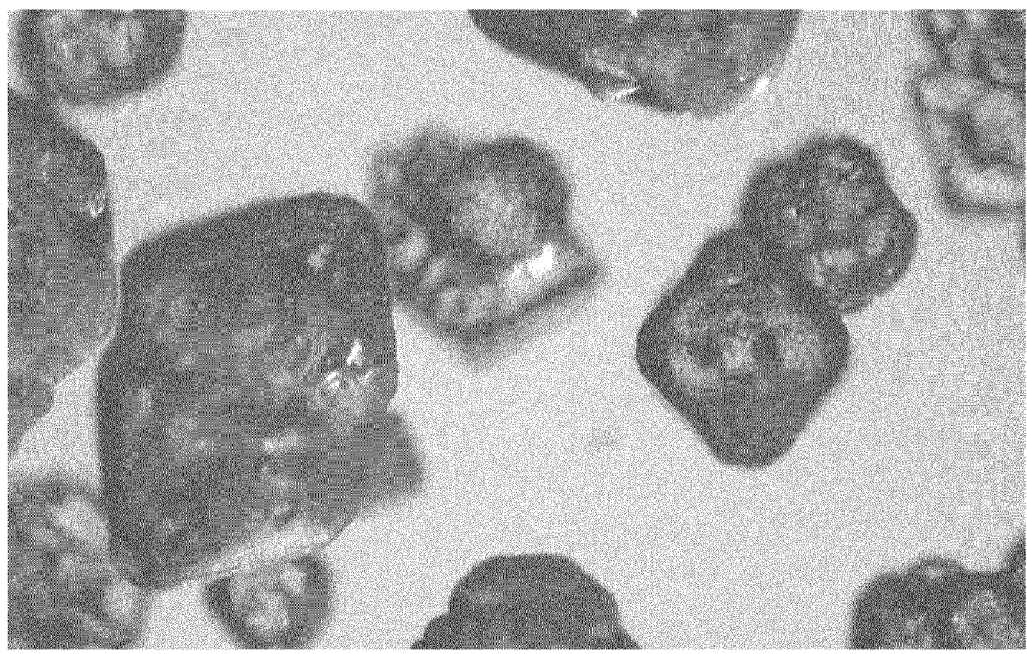
FIG. 3 (Example 2 [Comparative])
Figure 4:
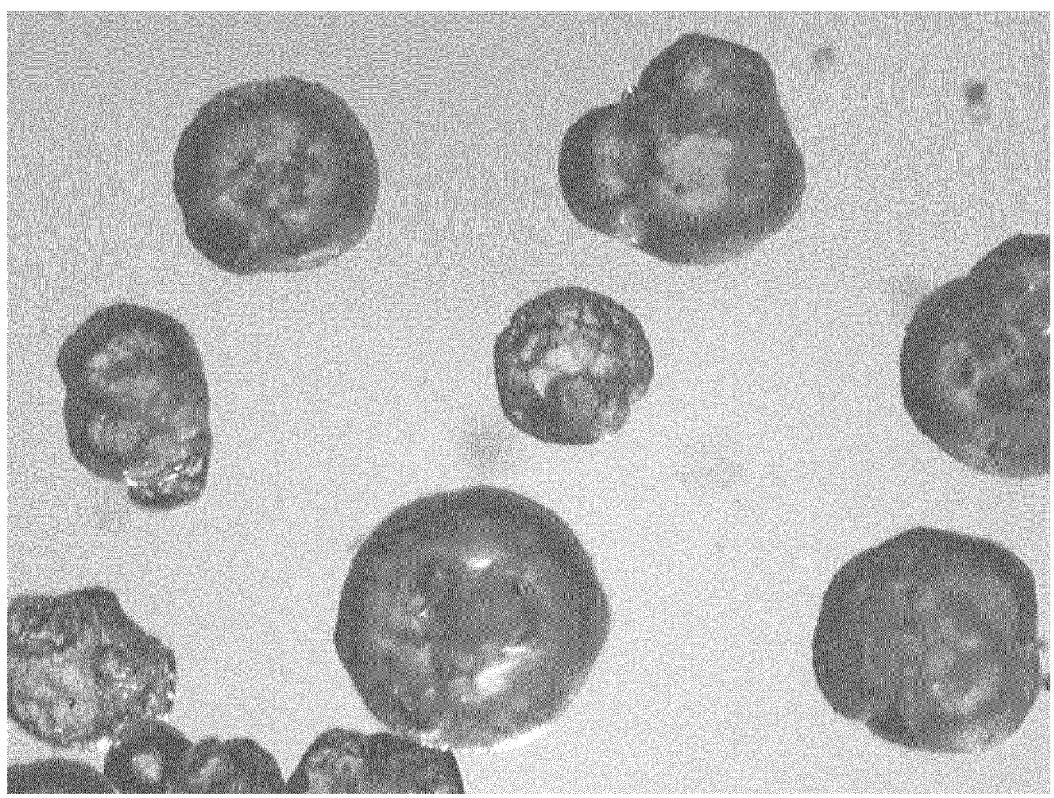
FIG. 4 (Example 3 [According to the Invention])
Figure 5:
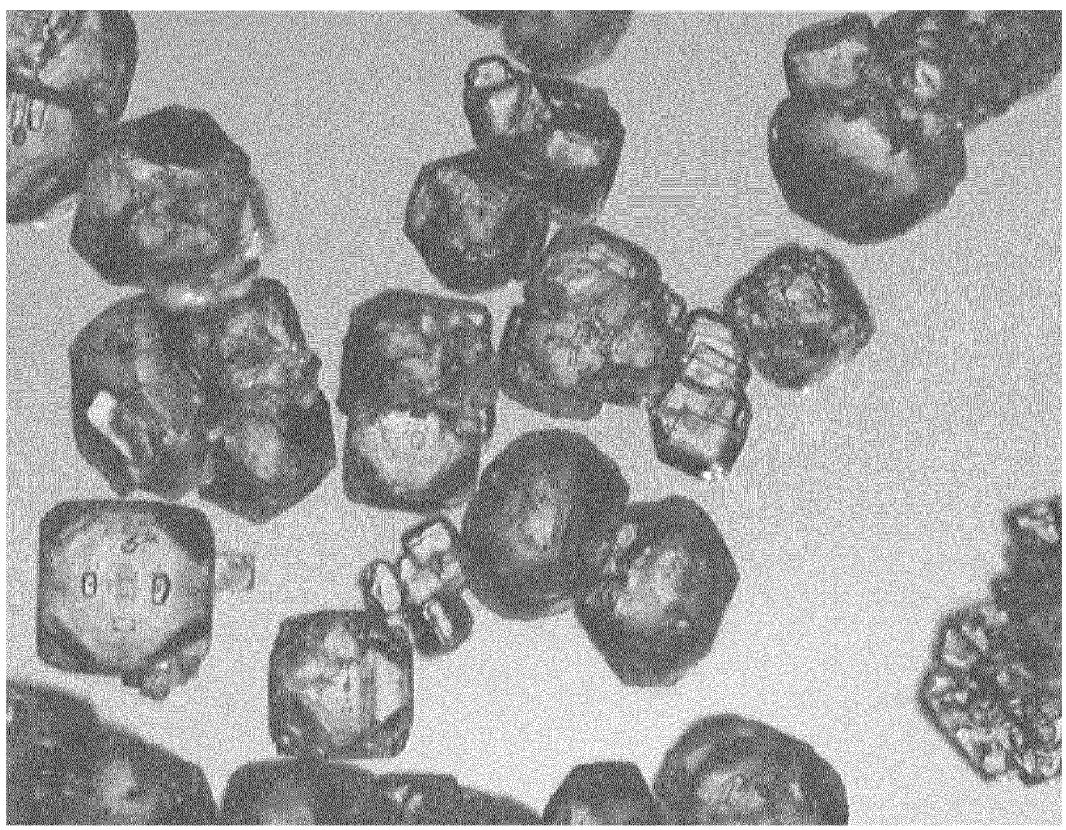
FIG. 5 (Example 4 [According to the Invention])
Figure 6:
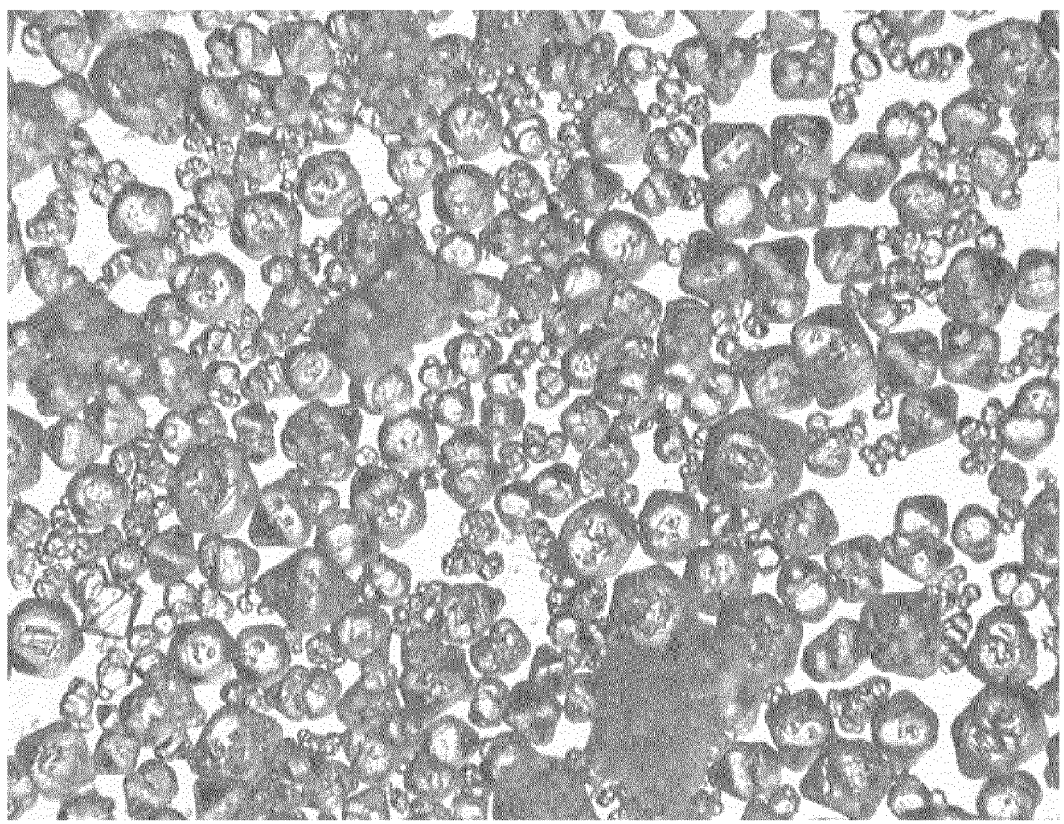
FIG. 6 (Example 6 [According to the Invention])
Figure 7:
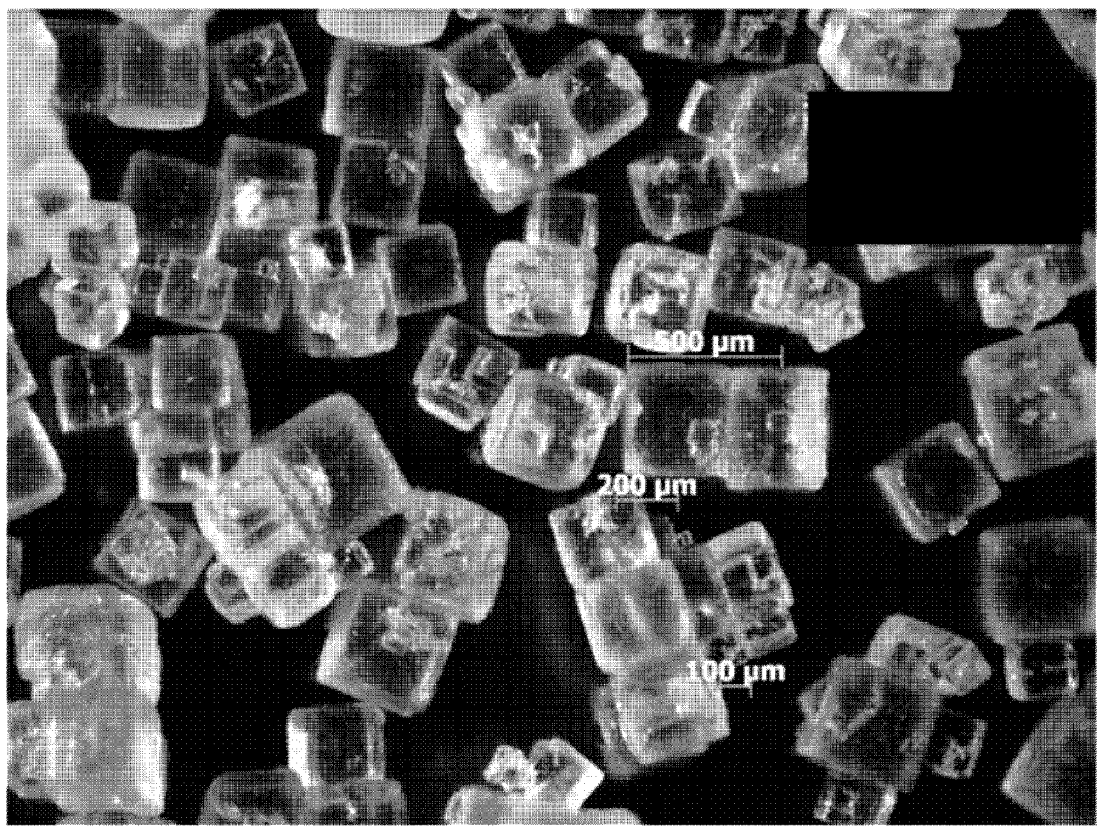
FIG. 7 (Testing Example)
Figure 8:
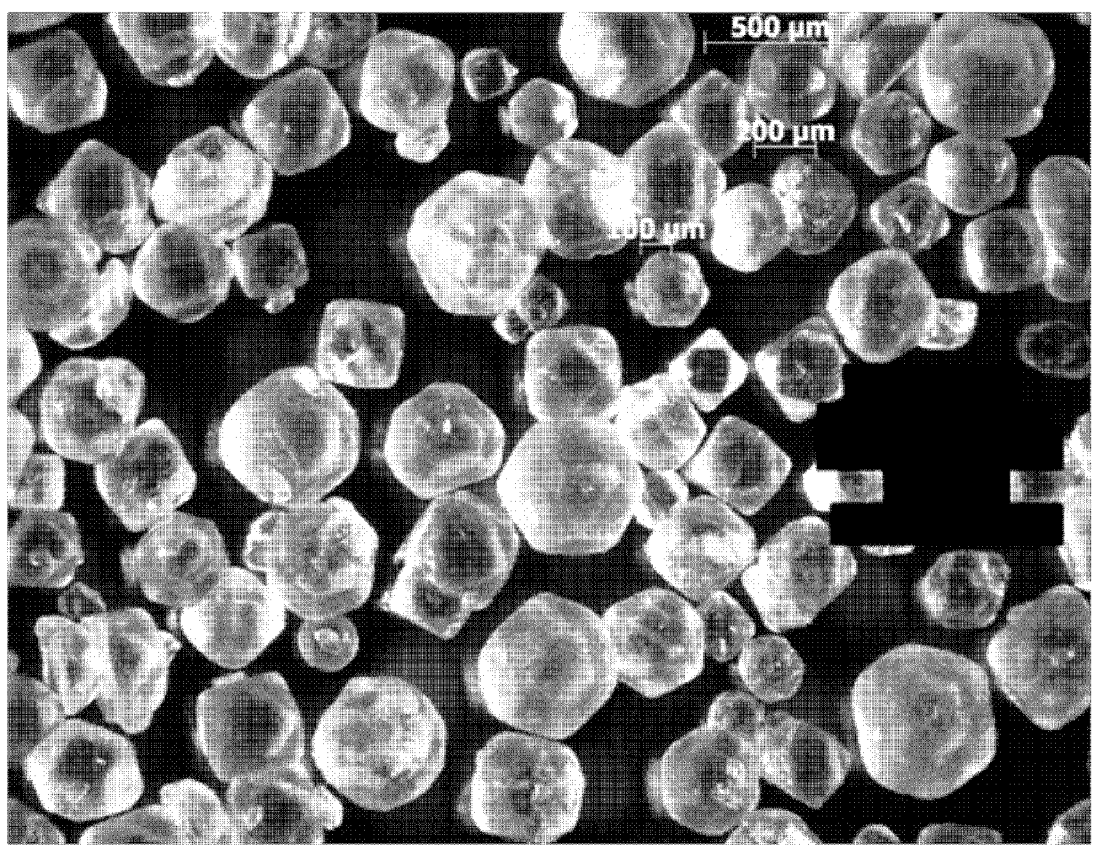
FIG. 8 (Testing Example)
Figure 9:
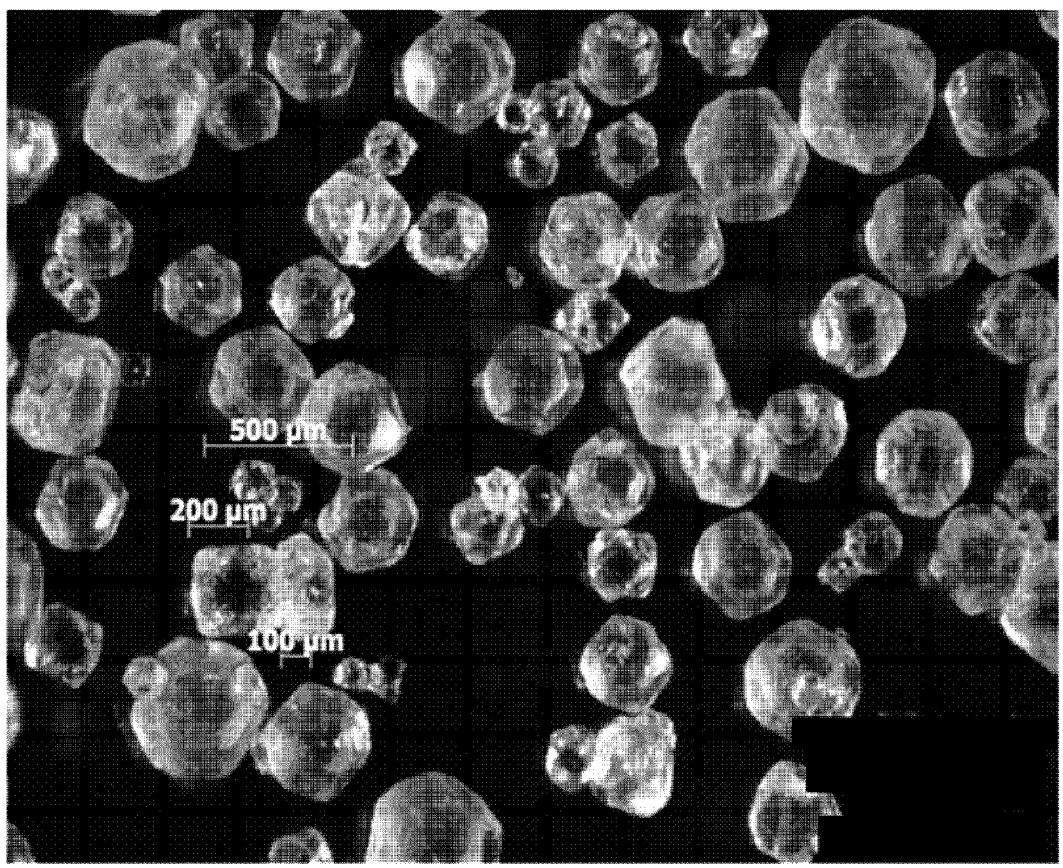
FIG. 9 (Testing Example)
Figure 10:
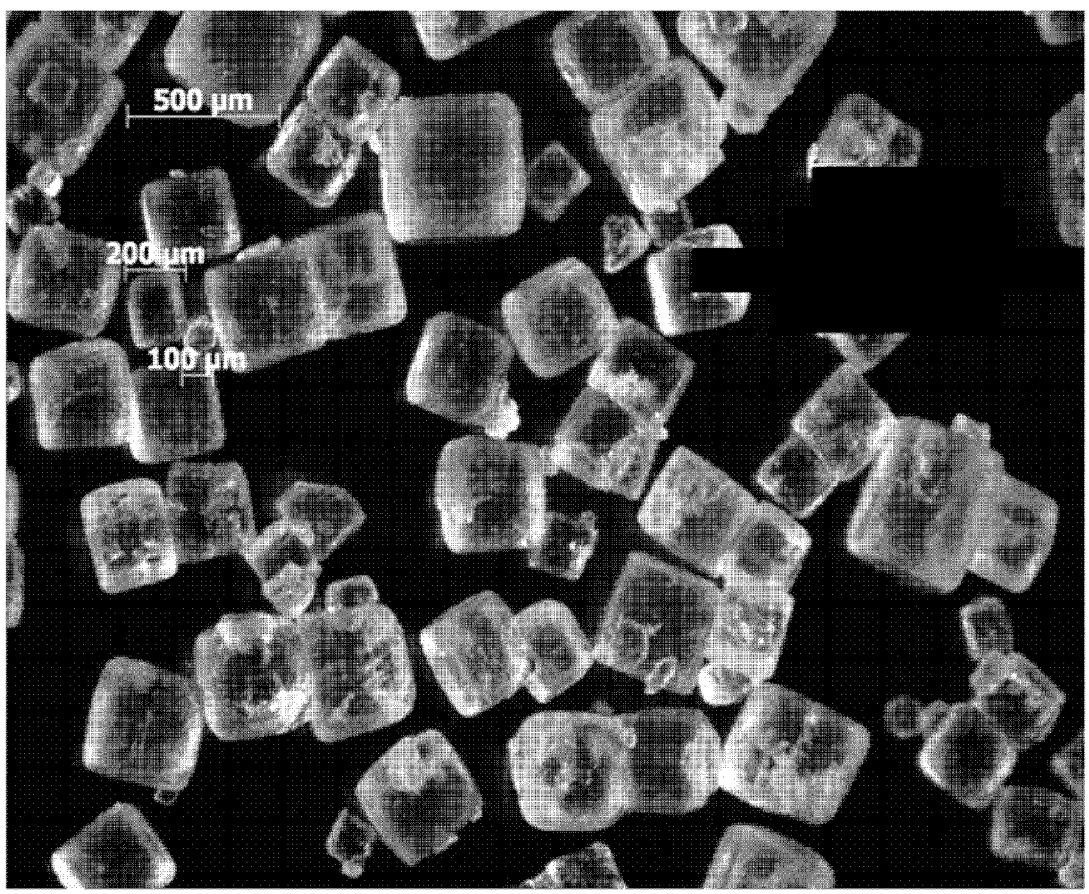
FIG. 10 (Testing Example)
Figure 11:
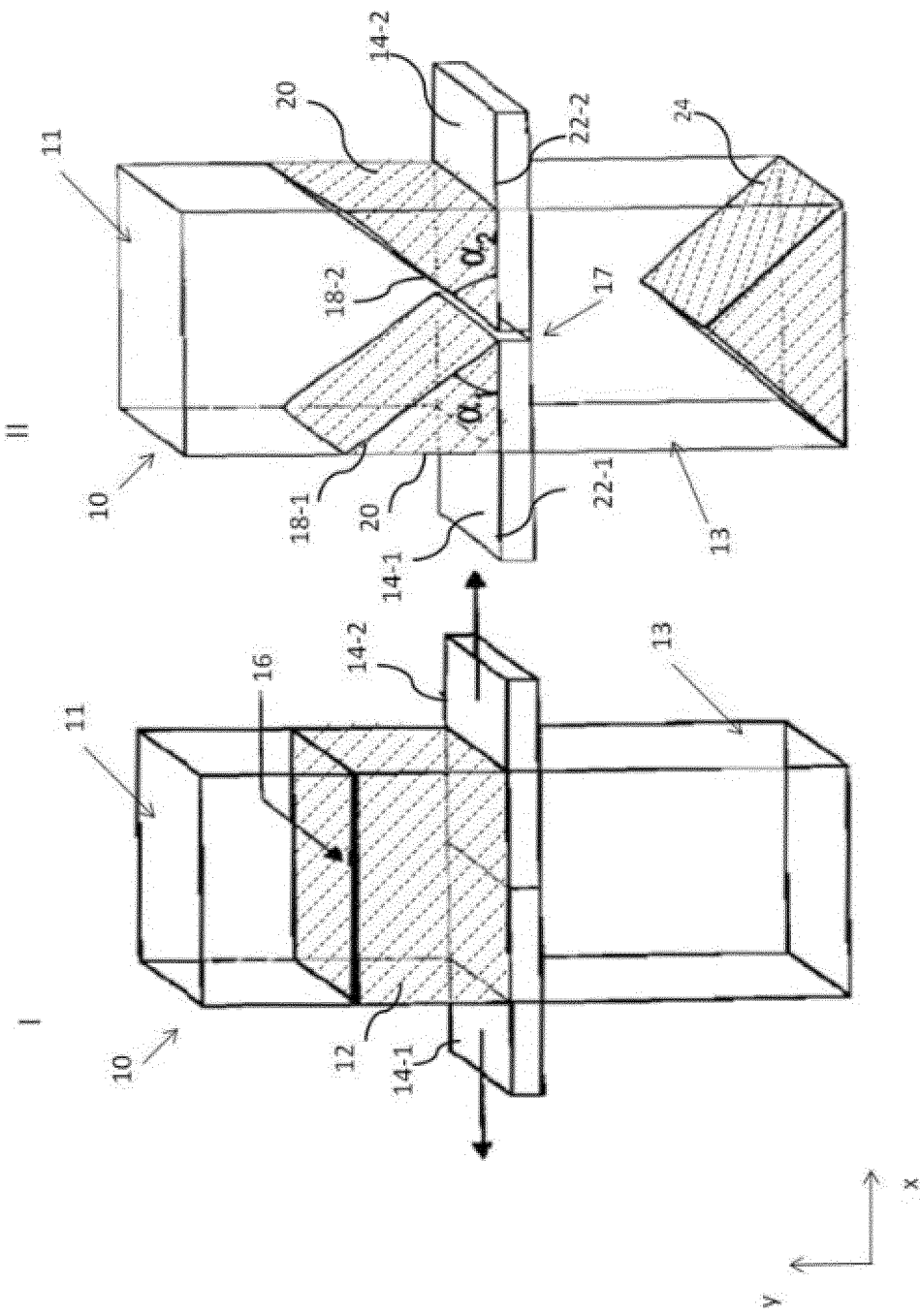
FIG. 11 (Apparatus and Principle of Measuring of Critical Angle of Approach)

Status (II) shows the measuring apparatus (10) after discharge of the salt from the filling area (11) to the bottom part (13) of the measuring apparatus (10). The gap width (17) between the horizontally moved plates (14-1) and (14-2) is measured. The angle of approach $\alpha_{1,2}$ is the angle $\alpha$ which is formed by a respective border-line (18-1), (18-2), of the remaining salt (20) remaining on the respective plate (14-1), (14-2), with a respective border-line (22-1), (22-2) of the respective plate (14-1), (14-2). The angle $\alpha$ is determined after the gap width (17), at which the salt started to flow, has been established. The remaining salt (20) is the salt remaining in the filling area (11). The salt (12) which has flown through the gap between the plates (14-1) and (14-2) forms a salt cone (24) at the bottom part (13) of the measuring apparatus (10).

The invention claimed is:

1. An evaporative crystallization process to make salt compositions comprising a first step wherein a mother liquor is formed containing water, a salt to be crystallized and 1-5 ppm of an additive, based on the weight of the mother liquor, said additive being a water-soluble acrylic polymer; and a second step of evaporating the water to form a crystallized salt.

2. The process according to claim 1, wherein the acrylic polymer contains sulfonate or phosphonate groups.

3. The process according to claim 1, wherein the acrylic polymer is a copolymer of acrylic acid and maleic acid, and/or their salts.

4. The process according to claim 1, further comprising a third step of washing the crystallized salt.

5. The process according to claim 1, further comprising a third step of drying the crystallized salt wherein the crystallized salt is only partially dried, such that a wet salt is produced.

6. The process according to claim 2, further comprising a third step of washing the crystallized salt.

7. The process according to claim 3, further comprising a third step of washing the crystallized salt.

8. The process according to claim 2, further comprising a third step of drying the crystallized salt wherein the crystallized salt is only partially dried, such that a wet salt is produced.

9. The process according to claim 3, further comprising a third step of drying the crystallized salt wherein the crystallized salt is only partially dried, such that a wet salt is produced.

10. The process according to claim 4, further comprising a fourth step of drying the crystallized salt wherein the crystallized salt is only partially dried, such that a wet salt is produced.

11. The process according to claim 6, further comprising a fourth step of drying the crystallized salt wherein the crystallized salt is only partially dried, such that a wet salt is produced.

12. The process according to claim 7, further comprising a fourth step of drying the crystallized salt wherein the crystallized salt is only partially dried, such that a wet salt is produced.

* * * * *